Oct. 27, 1942. R. I. KELTON Re. 22,212

AERIAL MAIL EXCHANGE

Original Filed July 22, 1936 3 Sheets-Sheet 1

Ralph I. Kelton INVENTOR

BY Victor J. Evans & Co.

ATTORNEYS

Oct. 27, 1942. R. I. KELTON Re. 22,212
AERIAL MAIL EXCHANGE
Original Filed July 22, 1936 3 Sheets-Sheet 2
Fig. 3.
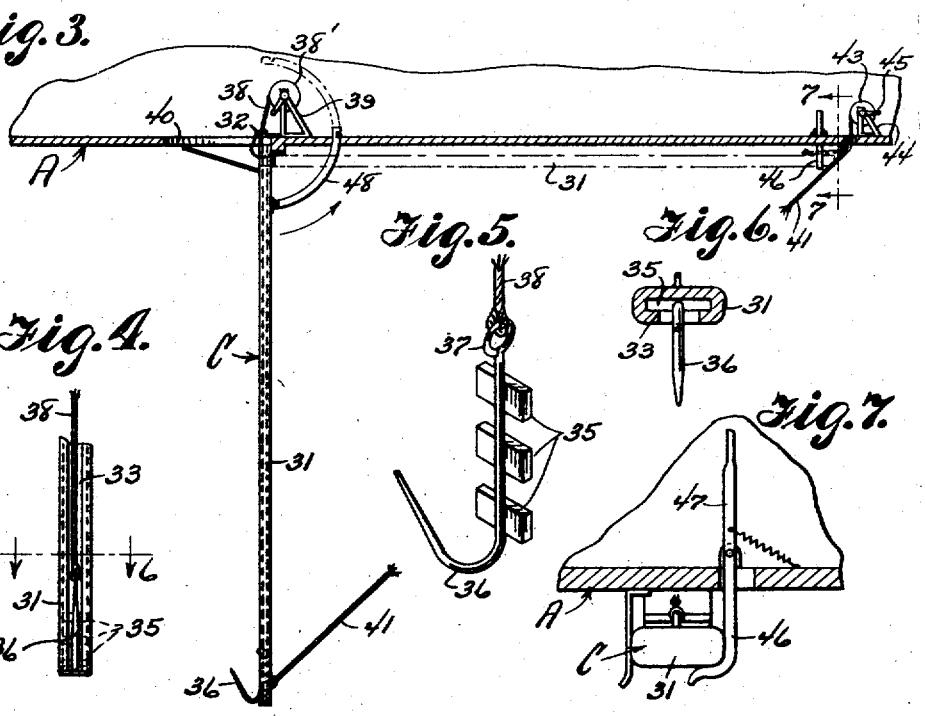
Fig. 4.
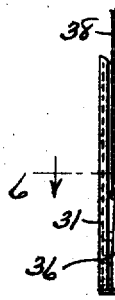
Fig. 5.
Fig. 6.
Fig. 7.
Fig. 8.
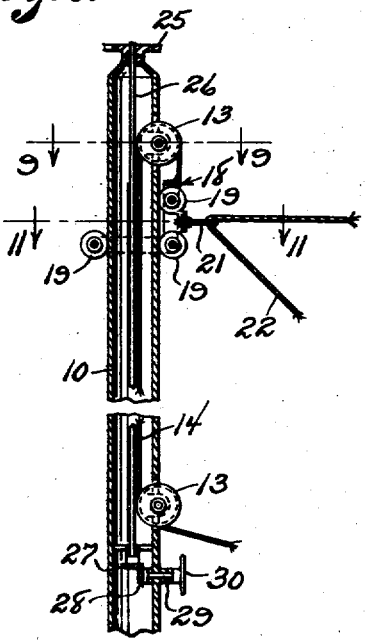
Fig. 9.
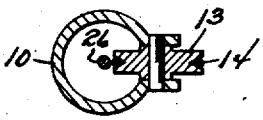
Fig. 10.
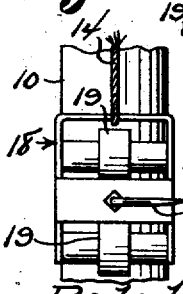
Fig. 11.
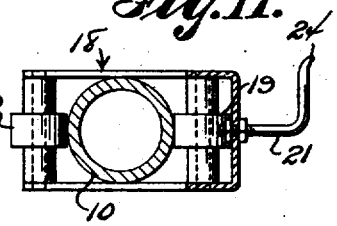
Ralph I. Kelton INVENTOR
BY Victor J. Evans & Co.
ATTORNEYS Oct. 27, 1942. R. I. KELTON Re. 22,212

AERIAL MAIL EXCHANGE

Original Filed July 22, 1936 3 Sheets-Sheet 3

Ralph I. Kelton INVENTOR

BY Victor J. Evans & Co.

ATTORNEYS

Reissued Oct. 27, 1942 Re. 22,212

UNITED STATES PATENT OFFICE 22,212

AERIAL MAIL EXCHANGE

Ralph I. Kelton, Watertown, Mass., assignor to All American Aviation, Inc., New Castle County, Delaware Original No. 2,141,536, dated December 27, 1938, Serial No. 91,953, July 22, 1936. Application for reissue April 24, 1940, Serial No. 331,410

3 Claims. (Cl. 258—1)

The invention relates to an aerial mail exchange and more especially to a pick-up and delivery apparatus for air mail.

The primary object of the invention is the provision of an apparatus of this character, where there is arranged on an aircraft a pick-up device, this operating with a ground station for the picking-up of mail therefrom while the aircraft is also equipped with a delivery device for the deposit of mail from the aircraft into a receiving basket at a ground station and in this fashion while the aircraft is in flight mail can be exchanged between the ground station and the said craft, the devices being of novel construction.

Another object of the invention is the provision of an apparatus of this character, wherein mail between a ground station and an aircraft in flight can be conveniently exchanged or transferred from one to the other without any interference in the flight of such plane and avoiding the necessity of a manual duty imposed upon the operator of the plane for effecting such exchange other than the proper piloting of the craft for effecting the exchange of mail.

A further object of the invention is the provision of an apparatus of this character, wherein the exchange devices for mail upon the aircraft are susceptible of being folded when inactive or set for operation of exchange and thus these will be out of the way and avoiding retarding of the flight of the plane as well as assuring quick exchange or transfer of mail from the craft to a station device and vice versa.

A still further object of the invention is the provision of an apparatus of this character, which is comparatively simple in its construction, readily and easily operated, thoroughly reliable and efficient in its functioning, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 3 is a fragmentary vertical longitudinal sectional view through the aircraft showing the pick-up device in position for the picking up of mail from the ground station.

Figure 4 is a fragmentary front elevation of such device.

Figure 5 is a perspective view of the pick-up hook thereof.

Figure 6 is a sectional view on the line 6—6 of Figure 4 looking in the direction of the arrows.

Figure 7 is a fragmentary sectional view on the line 7—7 of Figure 3 looking in the direction of the arrows.

Figure 8 is a fragmentary vertical longitudinal sectional view through a portion of the ground station device.

Figure 9 is a sectional view on the line 9—9 of Figure 8 looking in the direction of the arrows.

Figure 10 is a fragmentary side elevation.

Figure 11 is a sectional view on the line 11—11 of Figure 8 looking in the direction of the arrows.

Similar reference characters indicate corresponding parts throughout the several views in the drawings.

Figure 1:
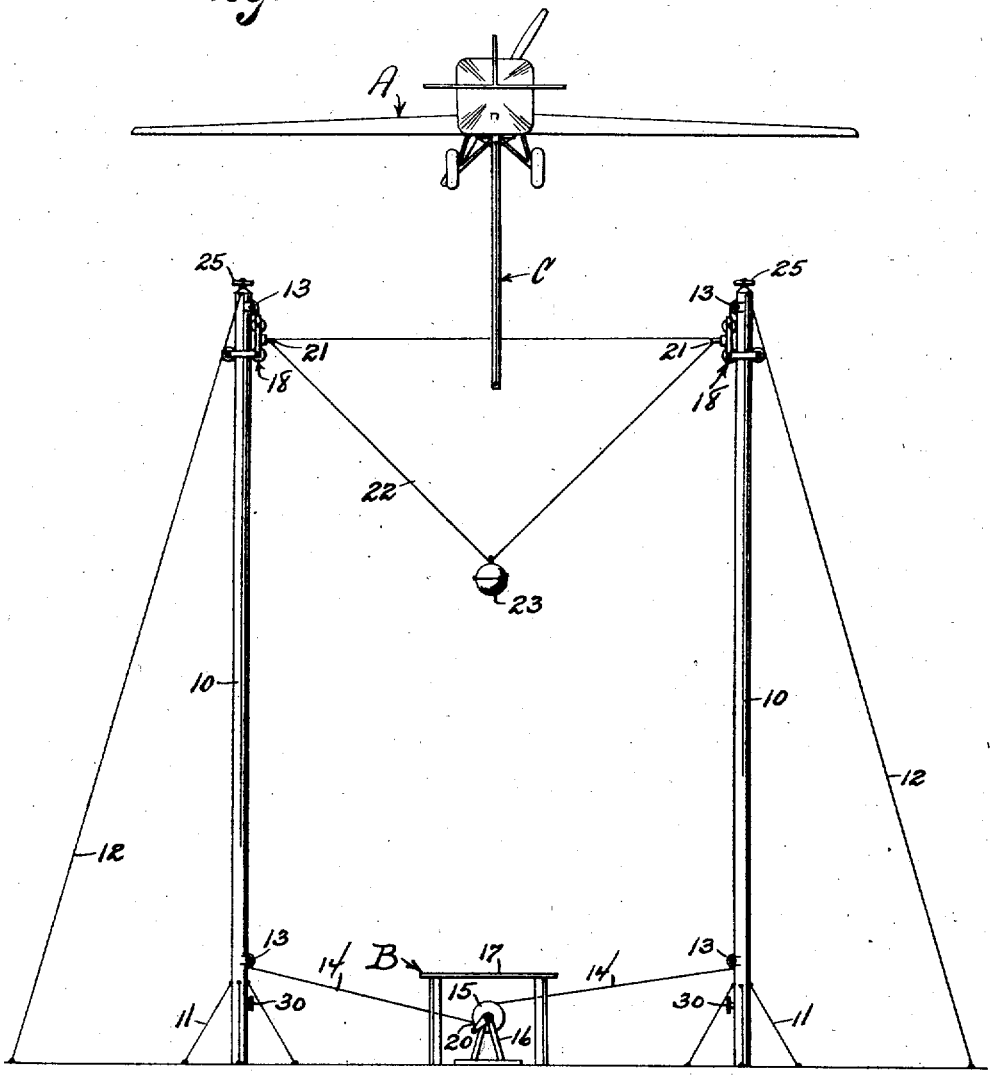
Figure 1 is an elevation of the aircraft showing the same in flight and in a position for the picking up of mail from a ground station by the apparatus constructed in accordance with the invention.
Figure 2:
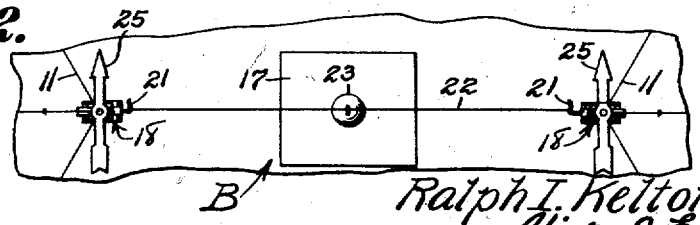
Figure 2 is a fragmentary plan view of the ground station showing pick-up mail supported thereby.

Referring to the drawings in detail, A designates generally an aircraft of any conventional type and B a ground station, respectively, the latter can be arranged on a ground foundation or upon the roof of a building. This station B comprises a pair of spaced perpendicular hollow masts or poles 10 which are suitably anchored in place and rigidly held by tie cables 11 and 12, respectively, while journaled near the upper ends of these masts or poles and also close to the foundation or roof supporting such masts or poles are guide pulleys 13 over which are trained cables 14, these at their lower ends being adapted to be wound on and from a windlass or drum 15 journaled in a stand 16 beneath a platform 17. The upper ends of the cables 14 are connected to carriages 18, each having rollers 19 for traction upon the companion mast or pole 10. These carriages 18 travel up and down upon said masts or poles 10 by the winding of the cables 14 on and from the windlass 15, the latter being rotated from a hand crank 20 at one side of the stand 16. This crank 20 is conveniently situated for the manual control thereof by an operator when upon the foundation or roof supporting the masts or poles.

The carriages 18 have rotatably fitted therein hook-like hangers 21 to be engaged by a suspension loop 22 supporting a pick-up pouch or mail bag 23. The loop being also adapted as a pick-up cable for the transfer of mail from the station B to the aircraft A in a manner presently described.

The hook-like hangers 21 are adapted for adjustment to let off freely the pick-up loop 22 from either side of the station B as on the pick-up of such loop 22 it freely rides off of the hangers 21 at the bill ends 24 thereof.

Rotatably arranged at the upper ends of the masts or poles 10 are arrows or pointers 25 serving as indicators, these being made fast to turning shafts 26 journaled centrally within the masts or poles 10 and each shaft 26 extends downwardly to a distance close to the foundation or roof supporting said masts or poles. The lower end of each shaft 26 has fixed thereto a gear 27 meshing with a pinion 28 fixed to a stud shaft 29 for a turn wheel 30 which is located outside of each mast or pole 10 and such wheel is hand operated for regulating the position of the pointer or indicator 25 at the top of each mast or pole. The purpose of the pointers or arrows 25 is to indicate to an aircraft operator the positioning of the hangers 21 for the letting off of pick-up mail to either side of the station B and thus such operator of the aircraft can properly direct his flight for the pick-up of mail at the station from either side thereof according to the indication of the pointers or arrows 25, these being set manually as before stated.

Exteriorly of the aircraft A at the bottom of its fuselage is a pick-up device C comprising a swinging pick-up arm 31 hinged at 32 for swinging movement either toward or away from such aircraft and when from the aircraft will assume a depending position with relation to the fuselage of the aircraft and which is the pick-up position of such arm. The arm 31 is formed with a longitudinal guide way 33 therein in which are fitted slides 35 permanently attached to and supporting a pick-up hook 36 having an eye terminal 37 to which is connected to cable 38 adapted to be wound on and unwound from a windlass or drum 38 carried in a stand 39 interiorly of the fuselage of the aircraft A. This cable 38 permits the hook 36 to be raised or lowered and when in lowered position it will be located on the arm 31 for the pick-up of the loop 22 for the transfer of mail within the pouch 23 from the station B to the craft A. On the pick-up of the loop 22 the hook 36 can be raised longitudinally of the arm 31 and thus permitting the pouch 23 to be drawn into the aircraft A through an opening 40 in the bottom of the fuselage of the aircraft for the receiving of the pouch 23 within the latter.

The arm 31 when the same is swung to a suspended perpendicular position can be folded or swung inwardly with respect to the fuselage of the aircraft A through a cable 41 attached at 42 to said arm 31 and also adapted to be wound on and unwound from a windlass 43 in a stand 44 interiorly of the aircraft A, the windless 43 being controlled by a manually operated handle 45.

Arranged at the bottom of the fuselage of the aircraft A is a latch 46 which is manually controlled by a lever 47 and is adapted to fasten the arm 31 when inwardly folded next to the bottom of the fuselage of the aircraft. This folded position of the arm 31 renders the pick-up device inoperative.

On releasing the arm 31 from the latch 46 the latter under its weight will gravitate to a depending perpendicular position beneath the fuselage of the aircraft A to assume a pick-up position and this arm when in said position is latched by a releasable brace 48 to avoid accidental folding of the arm and defeating the pick-up operation thereof. As has been indicated the arm when depending from the fuselage and on assuming a pick-up position the hook 36 will engage with the loop 22 of the pouch or bag 23 while the aircraft A is in flight so that mail matter from the station B can be picked up and received in the aircraft while in flight.

The carriages 18 riding on the masts or poles 10 will permit the loop 22 when suspended from the hangers 21 to be elevated the desired distance at the station B so that such loop and its pouch or bag can be picked up by an aircraft when in flight on the setting of the pick-up device thereon.

The platform 17 is for the purpose of convenience in the placing of the loop 22 with the pouch or bag 23 thereon upon the hangers 21 when the carriages have been lowered on the masts or poles 10 and such carriages 18 when raised on the masts or poles will position the loop 22 and its pouch or bag 23 at the proper elevation for the pick-up of the same.

At the station B particularly upon the roof of a building is arranged a receiving basket D having a concaved netted bottom 49 and vertical netted sides 50, respectively, the opposite ends 51 being closed and netted while at an intermediate point of the bottom for communication with the basket D is a throat 52 leading into a spiral chute 53 within a tubular column 54 which with the chute 53 opens into a place of deposit so that mail delivered from an aircraft in flight can be conveyed to this point or place of deposit from within the basket D, the delivery of the mail to the latter being hereinafter fully described. The closed ends 51 of the basket D prevent the mail pouch from bounding out of such basket and thus positive catching of the pouch can be assured.

The mail when within a pouch or bag on the dropping of the latter into the basket D will be caused to gravitate to and through the throat 52 and thence be carried down the spiral chute or way 53 to the point or place of deposit.

Figure 12:
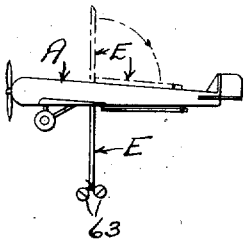
Figure 12 is a side elevation partly in section of a mail receiving basket showing in elevation an aircraft in position for the dropping of mail thereinto.
Figure 12:
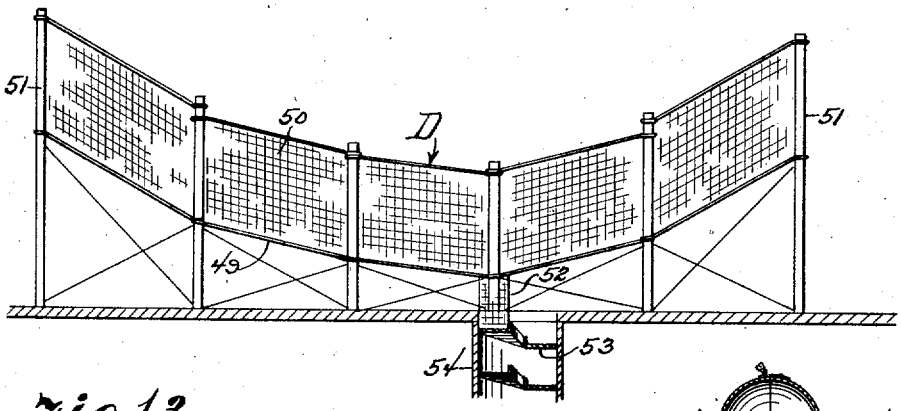
Figure 13:
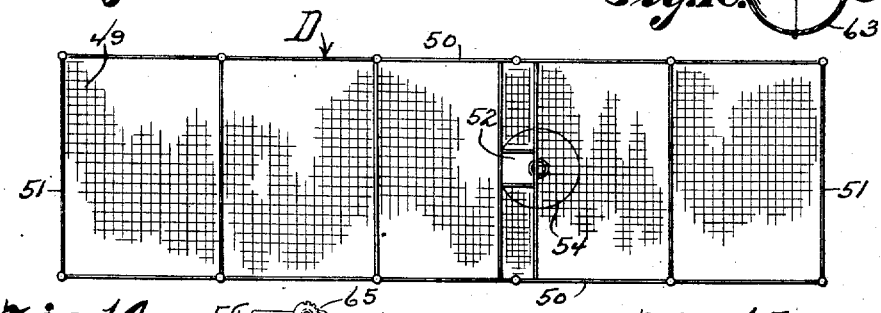
Figure 13 is a top plan view of the basket.
Figure 16:
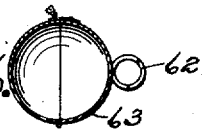
Figure 16 is a vertical sectional view through the mail pouch for the receiving and delivery or exchange of mail between an aircraft and a station.
Figure 14:
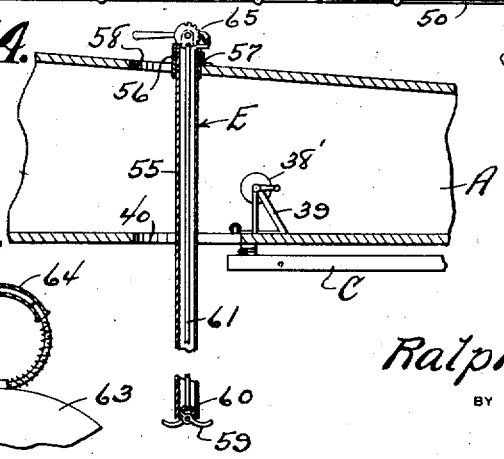
Figure 14 is a fragmentary vertical longitudinal sectional view through the aircraft showing the mail delivery device thereof.
Figure 15:
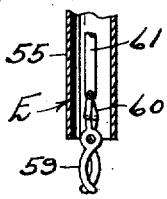
Figure 15 is a fragmentary vertical sectional view through the delivery device showing it in releasing position for mail.
Figure 17:
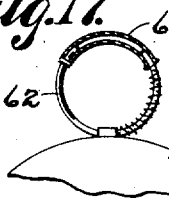
Figure 17 is a detail fragmentary sectional view showing the coupling ring of the pouch for the mail delivery device disclosed in Figures 14 and 15.

On the aircraft A is a mail delivery device E comprising a straight shiftable tube 55 slidable in a carrier sleeve 56 which is hinged at 57 to the top of the fuselage of the aircraft A whereby the tube 55 can be swung to an upright position or inwardly against the top of the fuselage of the craft A, the latter position being the normal disposition of said tube while the upright position is that for the delivery of mail from the aircraft to the station B or the receiving basket D. The upright position of the tube 55 is permitted by the forming of a clearance opening 58 in the top of the fuselage of the craft A which opening vertically aligns with the opening 40 in the bottom of said craft. The tube 55 at the delivery end thereof has pivoted thereto a grapple-like latch 59 operated from a link toggle 60 controlled by a shift rod 61 interiorly of said tube 55 and this grapple-like latch 59 releasably fastens a coupling ring 62 on and about the tube 55, the ring being attached to a mail pouch or bag 63 and is provided with a slidable opening and closing jaw 64 so that said ring can be conveniently placed loosely about the tube 55 or removed therefrom when the grapple-like latch 59 is in latching position. Thus it will be seen that any number of pouches or bags 63 for carrying mail can be loosely engaged or carried upon the tube 55 for delivery by the delivery device E, there being several pouches or bags carried by the said device as is shown in Figure 12 of the drawings.

When the tube 55 is wearing one or several of the pouches or bags 63 for its or their delivery it is, of course, understood that the tube 55 has been shifted from the position folded onto the top of the fuselage of the craft to an upright position and thence by hand an operator pulls downwardly upon the tube 55 to have the same lowered through the openings 40 and 58, respectively, in the fuselage whereby the pouches or bags 63 will be suspended beneath the craft A to the required distance conforming to the length of the tube 55 slidably fitting the sleeve 56 for enabling a successful delivery of mail from the aircraft to the basket D, the delivery being effected through an actuator 65 for the control rod 61 and this actuator is manually operated and is carried at the end of the tube 55 remote from the latch 59, being accessible through the opening 58 to an operator interiorly of the aircraft A.

The pouch or bag 23 is of spherical shape and is formed in separable or hingedly connected half globe form, although it may be of any other construction or type.

By the devices in the aircraft A and at the station B mail matter can be exchanged between the aircraft and said station while the craft is in flight and without interference with the flight thereof.

The mail matter is picked up from the station B for reception by the aircraft A while in flight while the mail matter to be delivered from the latter to the station B is dropped by the device E into the basket D whence it will be deposited at a determined place or point through the way 53 in the chute 54.

The arm 31 of the device C gives the proper reach to the hook 36 when it is required to pick up mail from the station B for reception in the aircraft A when in flight.

What is claimed is:

1. In combination with an aircraft having a fuselage, a pick-up device comprising a swinging pick-up arm, a longitudinal guide way therein, a plurality of slides fitting said guide way, a hook having a shank fixed to said slides, attaching means on said hook for attaching a cable thereto, a cable trained through said guide way and attached at one end to said attaching means, a windlass interiorly of the fuselage for the winding and unwinding of the cable on and from the same, the other end of said cable being affixed to said windlass, means for operating the arm to fold the same against the fuselage or unfold it away from said fuselage, and a bill on said hook extending forwardly of said arm and outside of said guideway.

2. In combination with an aircraft having a fuselage, a pick-up device comprising a swinging arm having a longitudinal guideway therein, a plurality of slides fitting said guideway, a hook having a shank fixed to said slides and attaching means on said shank for affixing a cable thereto, a windlass interiorly of said fuselage for the winding and unwinding of the cable on and off the windlass, one end of the cable affixed to said windlass and said cable trained through said longitudinal guideway and affixed at its other end to the attaching means on the shank of said hook, and an adjusting cable connected with said arm and operated from within the fuselage for the unfolding and folding of said arm relatively to said fuselage.

3. In an aircraft, a fuselage, an arm adjustably attached to the underside of said fuselage, said arm having a slotted, internal guideway extending a substantial part of the length thereof, a pick-up line adapted to be trailed from said aircraft, means carried by said fuselage for drawing in or paying out said pick-up line, a hook attached to the trailing end of said line, said hook having a carrier connected thereto slidable in said guideway to guide the hook lengthwise of said arm, said carrier holding the bill of said hook in the direction of movement of said aircraft.

RALPH I. KELTON.